Patented June 24, 1941

2,247,266

UNITED STATES PATENT OFFICE 2,247,266

CAPILLARY-ACTIVE SALT OF PYRIDINE BASES

Johan Pieter Wibaut and Johan Overhoff, Amsterdam, Netherlands, assignors to Shell Development Company, San Francisco, Calif., a corporation of Delaware No Drawing. Application January 14, 1939, Serial No. 251,032. In the Netherlands January 25, 1938

7 Claims. (Cl. 260—290)

This invention relates to a new class of capillary-active agents possessing valuable wetting, foaming, emulsifying, bactericidal and fungicidal properties. More particularly the invention relates to new and useful salts of pyridine bases and their use as capillary-active agents.

It is an object of this invention to provide a new class of capillary-active agents which may be economically produced from inexpensive and available materials. A further object is to provide new and useful capillary-active agents of the cation-active type. A still further object is to provide capillary-active salts which are especially effective in acid media and tend to buffer the hydrogen ion concentrations of solutions containing them. A still further object is to provide capillary-active agents which possess bactericidal and fungicidal properties. Additional objects will be apparent in the following description.

We have found that salts of pyridine bases having a suitable lipophile group attached to a nuclear carbon atom of the heterocyclic ring are excellent capillary-active agents possessing varying degrees of wetting, emulsifying, foaming, and in many cases bactericidal, fungicidal and detergent power.

The expression "a pyridine base" as used herein designates that class of tertiary heterocyclic nitrogen bases, such as pyridine, the various picolines, lutidines, collidines, etc., which contain the following characteristic structure

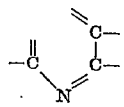

These pyridine bases, which are generally available in large quantities as by-products from the coke industry, the production of bone charcoal and the refining of petroleum, are weak bases which, per se or in the form of their salts with strong acids, are practically devoid of any useful capillary-activity. We have found, however, that if a lipophile group of suitable length is attached to one of the carbon atoms of the heterocyclic ring, new pyridine bases are formed which, in the form of suitable salts, possess capillary-active properties adapting them for use in various industries and making them especially suited for many special purposes.

The capillary-active salts of our invention contain at least one long chain saturated or unsaturated lipophile group of aliphatic character attached directly to a carbon atom of the heterocyclic ring. The capillary-active properties of the salts vary to a considerable extent, depending upon the size and character of the lipophile groups. In general, those salts in which the lipophile groups contain from about ten to about twenty-three carbon atoms in an aliphatic chain give the strongest capillary-activities and are superior for most purposes. As the length of the lipophile group is decreased below about ten carbon atoms the capillary-activities of the salts decrease; they tend to lose their cation-activity and approach neutrality (or even anion activity, depending upon the character of the acid used to form the salt), and their solubility in aqueous media increases. The effect of the lipophile group on one form of capillary-activity, i. e., the wetting-power, is shown in the following table wherein the wetting powers of pyridine sulfates containing various lipophile groups are listed. The wetting-power of cetyl pyridonium bromide, generally recognized as one of the best cation-active wetting agents, is also given for comparison.

TABLE I

Wetting power 20° C.

| Agent | Concentration | |
|---|---|---|
| | 0.10% | 0.25% |
| 2-(2-methyl nonyl) pyridine sulfate | 106 | 138 |
| 2-(2-methyl decyl) pyridine sulfate | 105 | 158 |
| 2-(2-methyl dodecyl) pyridine sulfate | 100 | 150 |
| 2-tridecyl pyridine sulfate | 155 | 267 |
| 2-heptadecyl pyridine sulfate | 67 | 156 |
| 2-(2-methyl hexadecyl) pyridine sulfate | 89 | 159 |
| Dialkyl-2-(2-methyl hexadecyl) sulfate | 95 | 146 |
| Cetyl pyridonium bromide | 158 | 233 |

From the above table it might appear that a straight chain lipophile group of about 13 carbon atoms is the optimum. It should be noted, however, that the optimum length and character of the lipophile group varies greatly, depending upon the particular pyridine base to which it is attached, the acid used to form the salt, the pH under which it is to be employed, and the particular activity most desired, i. e., wetting, detergent, flocculating, peptizing, etc. In the case of the salts of pyridine derivatives containing several short chain alkyl groups where these alkyl groups exert a slight lipophilic action, the predominating aliphatic lipophile group may be decreased to a chain of as low as seven carbon atoms, while still maintaining sufficient capillary-activity for many purposes.

The lipophilic pyridine bases, either prior to or subsequent to neutralizing with an appropriate acid to form the salt, may be modified, if desired, by the introduction of suitable atoms or groups into the heterocyclic ring and/or the lipophilic side chain. For example, the degree of dissociation of the salt in aqueous media may be altered by partially hydrogenating the pyridine base to form a mono- or diolefinic heterocyclic ring still containing the characteristic structure. Various groups such as halogen atoms, nitrate groups, nitro groups, hydroxyl groups, amino groups, sulfide groups, cycloparaffin groups, oxy-ether groups, thio-ether groups, mercaptyl groups, etc., may be substituted into the heterocyclic ring or the lipophile group to increase or decrease the solubility in aqueous media, to increase the bactericidal properties, or, in general, to make the products more effective for any certain specific application.

The properties of the present capillary active salts depend to a considerable extent upon the acid used to neutralize the pyridine base. For example, salts having a greater or lesser solubility in aqueous solutions, greater or lesser cation-activity, greater or lesser tendency to ionize, etc., may be produced from any given pyridine base by reacting with appropriate acids. In general, any of the more water-soluble acids having a dissociation constant ($K_a$) of $1 \times 10^{-4}$ or greater may be used. As suitable acids may be mentioned polybasic mineral acids such as sulfuric acid, sulfurous acid, phosphoric acid, phosphorous acid, arsenic acid, etc., mono-basic mineral acids such as hydrochloric acid, nitric acid, etc., polybasic organic acids such as maleic acid, oxalic acid, citric acid, fumaric acid, malic acid, malonic acid, tartaric acid, etc., mono-basic organic acids such as alpha chloro-acetic acid, dichlor acetic acid, alpha bromo-acetic acid, alpha bromo-propionic acid, lactic acid, formic acid, etc., stronger water-soluble sulfonic acids such as methyl sulfonic acid, ethyl sulfonic acid, etc., and the like relatively strong, water-soluble acids. Of these available acids the stronger and more water-soluble acids, such as the polybasic mineral acids yield, in general, salts having the best capillary-active properties. It should be observed that while the lower sulfonic acids may be used, an appreciable lipophile group attached to the sulfonic acid is undesirable. For this reason the sulfonic acid, if used, should not be in itself appreciably capillary-active, i. e., it should not contain more than about six carbon atoms in an alkyl chain. Valuable products are also obtained by neutralizing one or more of the present pyridine bases with a mixture of suitable acids. Although the salts are usually prepared before use one may also separately add the desired acid and the pyridine base at the time of use.

In general, in forming the surface-active salt, a mol of acid is used for each mol of lipophilic pyridine base. Capillary-active agents which are exceptionally effective for certain uses may also be prepared, however, by applying an excess of acid (for instance 2 mols of acid for each mol of the pyridine base). These salts containing excess free acid are, in general, very active and tend to buffer the solution (when used in aqueous media) at a hydrogen ion concentration corresponding approximately to the dissociation constant of the acid used.

The exceptional activity of these acid and salt mixtures is shown in the following table in which the results of comparative wetting experiments with the sulfuric acid salt of dialkyl-2-(2-methyl hexadecyl) pyridine, the same salt plus excess sulfuric acid, a widely used wetting agent ("sodium sulfonate B") and one of the best cation-active wetting agents in commercial use (cetyl pyridonium bromide) are tabulated.

TABLE II

Wetting power 20° C.

| Wetting agent | Concentration | |
|---|---|---|
| | 0.10% | 0.25% |
| Dialkyl-2-(2-methyl hexadecyl) pyridine+equimolar quantity of $H_2SO_4$ | 95 | 146 |
| Same as above+an equal weight of 96% $H_2SO_4$ | 178 | 295 |
| "Sodium sulfonate B" | 100 | 132 |
| Cetyl pyridonium bromide | 158 | 233 |

The following example describing the preparation of alpha tridecyl-pyridine sulfate will be of interest, we believe, since it illustrates one method of preparation which we have found to be, in general, suitable for the production of our new compounds.

EXAMPLE I

Normal dodecyl chloride is slowly added to a vigorously agitated mixture of alpha picoline and finely divided sodamide, the latter two reagents being preferably utilized in considerable excess (about twice the stoichiometric quantities). The reaction mixture is heated and maintained at about 128° C. with mild stirring until the reaction no longer proceeds at a practical rate. The reaction time will depend somewhat upon the pyridine base employed, the character of the aliphatic halide employed, the temperature at which the reacting mixture is maintained, the fineness and quality of the sodamide, the mol ratio of the reactants applied and the extent of reaction desired and may vary, in general, from about 10 to about 40 hours. In general, practical yields may be obtained in from about 12 to 20 hours, although, when reacting for a longer time under optimum conditions, yields of 90% may often be obtained. The reaction product is subsequently dissolved in acid, e. g., sulfuric acid, the non-basic constituents are removed and the solution is evaporated whereupon the residue yields the capillary-active salt.

Alpha tridecyl pyridine is a weak oily base melting slightly below room temperature and boiling at about 330°–340° C. When neutralized with acids it forms salts having strong foaming and wetting properties. As compared, for example, with one of the best cation-active wetting agents hitherto known (cetyl pyridonium bromide) the following results were obtained.

TABLE III

Wetting power 20° C.

| Wetting agent | Concentration | |
|---|---|---|
| | 0.10% | 0.25% |
| Alpha tridecyl pyridine sulfate | 155 | 267 |
| Cetyl pyridonium bromide | 158 | 233 |

Although the present invention is not limited in any manner by the above described method of preparing the present surface active salts, it will be seen that in the above mentioned method of attaching the desired lipophile group the entering group attaches itself to the 1-carbon atom of an alkyl group of the alkylated pyridine base with the elimination of one molecule of halogen acid, according to the scheme (neglecting the role of the sodamide):

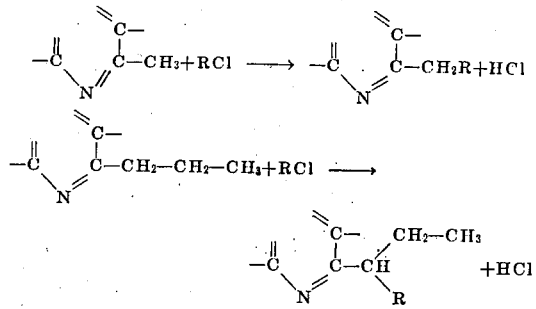

For certain applications it is found that surface-active agents in which the lipophile group is of a branched structure, are superior. Compounds of the present class having the preferred branched chain lipophile groups may be easily and most economically prepared, as in Example I, by applying suitable secondary chlorides which, in turn, are readily available and easily prepared from olefine hydrocarbons and anhydrous hydrochloric acid. These preferred compounds may also be prepared by reacting a suitable methylpyridine base with one aliphatic halide and subsequently reacting with a second aliphatic halide, in which case the second aliphatic halide substitutes itself for a second hydrogen atom of the methyl group. This may be illustrated by the following equations in which R and R' represent the same or different saturated or unsaturated lipophile groups of aliphatic character.

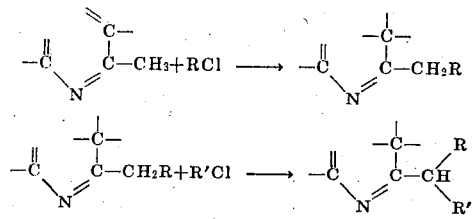

The desired lipophilic pyridine base may be prepared, according to the above described method, from any one or a mixture of a large number of common alkyl pyridine bases. Thus, for example, the derivatives of pyridine, containing one or more short alkyl groups, such as methyl, ethyl or propyl, preferably in the alpha and/or gamma nuclear carbon atom, are generally available and may be conveniently employed. Although our invention is not so limited, we have found the mixture of lower alkyl pyridine bases recovered as a by-product in the refining of petroleum products to be exceptionally suitable, not only from the standpoint of availability and economy, but also as regards the properties of the resultant products. This is due, we believe, to the fact that most of the pyridine bases obtained from petroleum (especially cracked petroleum distillates) are rich in highly methylated pyridines, such as, for instance, di-, tri- and perhaps tetra- and penta-methyl pyridine, which compounds appear to give exceptionally good products.

The present capillary-active salts, although varying considerably in properties depending primarily upon the length and character of the lipophile group and the character of the acid used to form the salt, constitute a new and distinct class of capillary-active agents possessing certain common characteristic properties. These agents differ, for example, from the more common capillary-active agents in that they are, in general, cation-active. Such capillary-active agents as the common soaps, Turkey red oil, the piperidine salts of sulfonic acids, etc., are anion-active, i. e., they dissociate upon use to give capillary-active negatively charged anions. The present salts, in general, owe their capillary-activity, on the other hand, to capillary-active positively charged cations. Although capillary-active agents of the anion-active and cation-active types both exhibit varying degrees of wetting action, emulsifying action, foaming action, etc., these two classes of agents are essentially different and cannot, as a rule, be used interchangeably. For example, while anion-active agents tend to peptize particles carrying a negative charge, the cation-active agents tend to de-peptize such particles.

Another valuable and characteristic property generally noticed in the present salts is their enhanced activity under acid conditions. As was pointed out above, the agents prepared by reacting the lipophilic pyridine base with an excess of acid have considerably enhanced wetting properties. The enhanced activity of these agents is even more pronounced in the case of the emulsifying power. Many of the present agents, especially those prepared by reacting a suitable lipophilic pyridine base, with an excess of acid, are excellent emulsifying agents producing acid emulsions which may be broken at will by decreasing the acidity, for instance, by the addition of an alkali. The lack of an appreciable emulsifying power under alkaline or neutral conditions and the excellent emulsifying power observed under acid conditions are illustrated by the following example.

EXAMPLE II

When it was attempted to produce an emulsion of a common spindle oil in water using 2% of dialkyl-2-(2-methyl hexadecyl) pyridine sulfate as an emulsifying agent the aqueous layer was found to contain less than 1% of emulsified spindle oil. When, however, the dialkyl-2-(2-methyl hexadecyl) pyridine sulfate was first mixed with an equal weight of 96% $H_2SO_4$ and 2% of this agent (based on the original pyridine salt) was used the aqueous layer was found to contain 25% of emulsified spindle oil and by using 5% of the latter agent the aqueous layer was found to contain even as much as 80% of emulsified spindle oil.

Capillary-active agents containing the present salts are not confined to such as are made with and contain water as the essential liquid medium. Water is preferred, but may be replaced by alcohols, ketones, etc., as required or found desirable.

The capillary-active agents of the present invention, in view of their varied capillary activity, are eminently suited for many varied applications. They may, for example, find application in the washing, treating and dyeing of textile fibres, in fulling and felting processes, in sizing preparations, in delustering fabrics, in the production of finely divided organic and inorganic pigments for the paint, lacquer and ink trades, in the soaking, deliming, bating and dyeing of leather, in the treating of rags and pulp in paper manufacture, in the preservation of wood, in the breaking of negatively charged emulsions, in acid electrolytic baths, etc. In view of valuable bactericidal and fungicidal properties of many of the present agents (especially those containing sulfur and/or ethylenic linkages) they are especially suitable for use in germicides, fungicides, insecticides, etc.

The present salts may be used either alone or in conjunction with other agents. Agents especially suitable for certain purposes may often be prepared from a mixture of the present salts with other capillary-active agents. For example, superior washing liquids may be prepared using one of the present foaming agents in conjunction with a detergent of another class. In the preparation of emulsions, for example, they may be used alone or in conjunction with protective colloids such as starch, mucin, isinglass, gum arabic, etc., and/or other emulsifying agents. Since the present agents, in general, possess a certain tanning action and precipitate glue and gelatin from acid aqueous solutions, these protective colloids may only be used in conjunction with the present agents under conditions which do not cause precipitation. When used in conjunction with an anion-active emulsifying agent such as the alkali salts of alkyl esters of polybasic acids, alkali salts of fatty acids, Turkey red oil, salts of aromatic sulfonic acids, etc., the present emulsifying agents are capable of giving very concentrated emulsions which are especially desired for certain purposes. They may, moreover, be used in conjunction with organic solvents such as cyclohexanol, cyclohexanone, glycol monoethyl ether, glycol dimethyl ether, octyl alcohol, cetyl alcohol, phenol, cresol, benzyl alcohol, carbon tetrachloride, tetrachlor ethylene, ethylene sulfide, benzene, toluene, ethylene oxide, tetrahydronaphthelene, tricresyl phosphate, glycerine, ethylene glycol, etc., and other substances, such as pharmaceutically active substances, disinfectants, perfumes, coloring agents, superfatting agents, bentonite, fuller's earth, talc, sugar, molasses, starch, dextrin, boric acid, sodium hexameta phosphate, sodium naphthalene sulfonate, the sodium perborates, persulfates, perphosphates, benzyl peroxide, beta naphthol, triethanol amine, etc.

By the use of the present agents excellent emulsions containing various proportions of the various petroleum oils, waxes and asphalts, vegetable oils, fish oils, animal tallows, bone grease, neets foot oil, spermaceti, beeswax, mineral and vegetable waxes, synthetic waxes, natural and synthetic resins, etc., may be prepared. For example, they are well suited for the production of asphalt emulsions for road building and repairing in which case they materially enhance the bonding of the emulsion. Since the present agents possess, in general, a good solubility in lipophilic substances they may, in many cases, be dissolved in one or a mixture of the above materials, with or without the addition of other agents, to render them self-emulsifying, f. e., readily emulsifiable upon mixing with aqueous media. They are, moreover, eminently suited for use in many chemical processes where it is desired to react two immiscible liquids under acid conditions. By the use of the present agents the reactants may be emulsified prior to or during the reaction and the emulsion quickly and easily broken at will upon completion of the reaction. In view of their strong emulsifying power under acid conditions and the ease with which the emulsions may be broken at will, the present agents are also especially suited for the production of synthetic resin molding powders.

Since the emulsions produced with the aid of the present agents, unlike those produced with the usual emulsifying agents such as Turkey red oil, sulfonic acid salt, etc., are, in general, positively charged, they are superior to emulsions produced with the aid of the usual emulsifying agents in processes such as the oiling of leather, the waterproofing of fabrics, rubber coating and the like where it is desired to impregnate a material with the dispersed phase of the emulsion or deposit a well bonded coating that will not easily strip.

Since the present agents impart, in general, strong frothing and sudsing qualities to aqueous media when dissolved therein, they may find application in numerous instances where it is desired to increase the contact between a liquid and a gas such as, for instance, in the washing of gases, aerating of liquids, etc., and where a stable froth or suds is desired, such as in fire extinguishing compositions, in the flotation of minerals, in certain textile dyeing processes, in washing liquids, etc. The foaming power of 2-(2-methyl decyl) pyridine sulfate, 2-(2-methyl dodecyl) pyridine sulfate and 2-tridecyl pyridine sulfate, for example, are equal or slightly superior to the sodium salts of the mono sulfuric acid esters of alcohols containing from 10 to 18 carbon atoms (which salts are noted for their strong foaming and detergent power). As the lipophile group in the present compounds is increased beyond about 12 carbon atoms the foaming and frothing power is increased. 2-(2-methyl hexadecyl) pyridine sulfate, for example, is an exceptionally efficient foaming agent.

Other applications for which the present agents are especially suited include the washing of animal fibres such as wool, silk, etc., the degumming of silk, and the washing of dyed silks. The scouring of wool, particularly that obtained from the skins by liming, presents considerable difficulty due to the lime present. In the usual practice the lime is removed as far as possible by a mechanical treatment and then the wool is washed in a strong alkaline soap bath. By the use of the present agents the wool may be scoured efficiently while completely avoiding the use of alkaline agents which tend to render the wool harsh and tender. They are also suitable for the acid treatment of wool and other animal fibers to improve the handle. Dyed silks may be washed in acid conditions with the aid of the present agents with a minimum bleeding of the dye.

We claim as our invention:

1. A capillary-active agent, said agent being a water soluble acid salt of a water-soluble polybasic acid and a non-quaternary alkyl pyridine, said alkyl pyridine having directly attached to separate carbon atoms of the pyridine ring at least one alkyl group of less than four carbon atoms and an aliphatic carbon chain of at least ten carbon atoms, said alkyl pyridine being free from elements other than carbon, hydrogen and nitrogen.

2. A capillary-active agent, said agent being a water-soluble, acid salt of a water-soluble polybasic mineral acid and a hexadecyl non-quaternary pyridine having the hexadecyl group directly attached to a carbon atom of the pyridine ring.

3. A capillary active composition comprising a solution of free sulfuric acid and of a non-quaternay water-soluble acid sulfate of a heterocyclic nitrogen base having the general formula

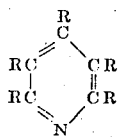

wherein each R represents a constituent selected from the group consisting of the hydrogen atom and aliphatic hydrocarbon chains, and wherein one of said constituents is an aliphatic lipophilic hydrocarbon radical containing at least seven carbon atoms in the chain, the free sulfuric acid being present in a quantity in excess of that stoichiometrically necessary to form the acid sulfate.

4. A capillary-active composition comprising a solution of a non-quaternary water-soluble acid salt of a water-soluble dibasic acid and of a heterocyclic nitrogen base having the general formula

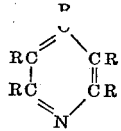

wherein each R represents a constituent selected from the group consisting of the hydrogen atom and aliphatic hydrocarbon chains, and wherein one of said constituents is an aliphatic lipophilic hydrocarbon radical containing at least seven carbon atoms in the chain, and a free water-soluble dibasic acid which is present in a quantity in excess of that stoichiometrically necessary to form the acid salt.

5. A capillary-active composition of a non-quaternary water-soluble acid salt of a water-soluble polybasic acid and of a heterocyclic nitrogen base having the general formula

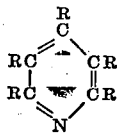

wherein each R is a constituent selected from the group consisting of the hydrogen atom and aliphatic hydrocarbon chains, and wherein one of said constituents is an aliphatic lipophilic hydrocarbon radical containing at least seven carbon atoms in the chain.

6. A capillary-active non-quaternary water-soluble acid salt of a water-soluble polybasic acid and a heterocyclic ternary nitrogen base having the general formula

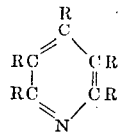

wherein each R is a constituent selected from the group consisting of the hydrogen atom and aliphatic hydrocarbon chains, and wherein one of said constituents is an aliphatic hydrocarbon chain of at least seven carbon atoms, while at least one of the remaining constituents is an alkyl group of less than four carbon atoms.

7. A capillary-active non-quaternary water-soluble acid salt of a water-soluble polybasic mineral acid and a heterocyclic nitrogen base having the general formula

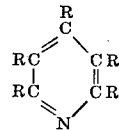

wherein each R is a constituent selected from the group consisting of the hydrogen atom and aliphatic hydrocarbon chains, and wherein one of said constituents is an aliphatic lipophilic hydrocarbon radical containing at least seven carbon atoms in the chain.

JOHAN PIETER WIBAUT.
JOHAN OVERHOFF.